United States Patent
Kirkpatrick (10) Patent No.: US 8,622,731 B2
(45) Date of Patent: Jan. 7, 2014

(54) APPARATUS FOR FORMING FLANGES ON COMPONENTS

(75) Inventor: Bowden Kirkpatrick, Benington, VT (US)

(73) Assignee: General Electric Company, Niskayuna, NY (US)

( * ) Notice: Subject to any disclaimer, the term of this patent is extended or adjusted under 35 U.S.C. 154(b) by 168 days.

(21) Appl. No.: 12/371,984

(22) Filed: Feb. 17, 2009

(65) Prior Publication Data

US 2010/0207304 A1    Aug. 19, 2010

(51) Int. Cl.
*B29C 51/10* (2006.01)

(52) U.S. Cl.
USPC ........................................ 425/405.2; 264/544

(58) Field of Classification Search
USPC ................................ 425/500, 502; 264/314, 315
See application file for complete search history.

(56) References Cited

U.S. PATENT DOCUMENTS

| | | | | |
|---|---|---|---|---|
| 4,445,829 A | * | 5/1984 | Miller | 417/543 |
| 5,151,236 A | * | 9/1992 | Azzara et al. | 264/257 |
| 5,262,121 A | | 11/1993 | Goodno | |
| 5,318,647 A | * | 6/1994 | Mitchell | 156/216 |
| 5,468,331 A | * | 11/1995 | Makarenko et al. | 156/494 |
| 5,648,109 A | * | 7/1997 | Gutowski et al. | 425/504 |
| 6,321,570 B1 | * | 11/2001 | De Vries et al. | 65/104 |
| 6,632,502 B1 | | 10/2003 | Allen et al. | |
| 6,743,504 B1 | | 6/2004 | Allen et al. | |
| 7,246,990 B2 | | 7/2007 | Xie et al. | |
| 2005/0053762 A1 | * | 3/2005 | Willden et al. | 428/122 |
| 2005/0276874 A1 | * | 12/2005 | Menaldo et al. | 425/129.1 |
| 2006/0240140 A1 | * | 10/2006 | Banjo et al. | 425/450.1 |
| 2008/0302915 A1 | * | 12/2008 | Yip et al. | 244/132 |

FOREIGN PATENT DOCUMENTS

WO    2008066606    6/2008

OTHER PUBLICATIONS

Jansson N.E., Lutz A., Wolfahrt M., and Sjunnesson A.; Title:Testing and analysis of a highly loaded composite flange; http://extra.ivf.se/eccm13_programme/abstracts/2620.pdf, Nov. 4, 2008.

* cited by examiner

*Primary Examiner* — Christina Johnson
*Assistant Examiner* — Xue Liu
(74) *Attorney, Agent, or Firm* — Scott J. Asmus (57) ABSTRACT

An apparatus for forming a flange on a component is provided. The apparatus comprises a mold disposed for placement of the component thereon, a forming element configured to hold the component on the mold to facilitate formation of the flange, and a pressure element configured to cooperate with the mold to define a space therebetween. The apparatus further comprises a bladder disposed in the space and configured to impart a forming force to a portion of the component to form the flange on the component when the bladder is inflated. A method for forming a flange on a component is also presented.

17 Claims, 9 Drawing Sheets

APPARATUS FOR FORMING FLANGES ON COMPONENTS

BACKGROUND

This invention relates generally to an apparatus and methods for forming flanges on components. More particularly, this invention relates to an apparatus and methods for forming flanges on composite components.

Components often have flanges to increase the stiffness thereof and/or to facilitate assembly with other parts. As used herein, the term "flange" may indicate a raised rim or lip of a fitting. Some conventional processes have been implemented to form the flanges on components, such as metal parts. However, these methods are not suitable to form the flanges on composite components.

Composite components, such as fan cases, have been used in a variety of fields, such as the aerospace industry. It is relatively straightforward to deposit composite material in a cylindrical configuration to form tubular composite components. However, current processes for forming flanges on composite components are labor intensive, and the quality of the flanges can be operator-dependent. In particular, it is difficult to form flanges automatically or semi-automatically due to the complexity of the motions and the intricacy of the manipulation during material placement.

As current processes are ill equipped to form flanges in composite components, it would be desirable to have improved apparatuses and methods for forming the flanges in composite components. It would further be desirable for the improved apparatuses and methods for forming flanges to be suitable for use in automated or semi-automated composite lay-up processes.

BRIEF DESCRIPTION

An apparatus for forming a flange on a component in accordance with one embodiment is provided. The apparatus comprises a mold disposed for placement of the component thereon, a forming element configured to hold the component on the mold to facilitate formation of the flange, and a pressure element configured to cooperate with the mold to define a space therebetween. The apparatus further comprises a bladder disposed in the space and configured to impart a forming force to a portion of the component to form the flange on the component when the bladder is inflated.

Another embodiment of the invention further provides a method for forming a flange on a component. The method comprises placing a bladder on a mold, placing a component on the mold, providing a forming element to hold the component on the mold, providing a pressure element to cooperate with the mold to confine the bladder and to receive a portion of the component therebetween, and inflating the bladder to impart a forming force to the portion of the component to form the flange on the component.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION OF THE DISCLOSURE

Preferred embodiments of the present disclosure will be described hereinbelow with reference to the accompanying drawings. In the following description, well-known functions or constructions are not described in detail to avoid obscuring the disclosure in unnecessary detail.

Figure 1:
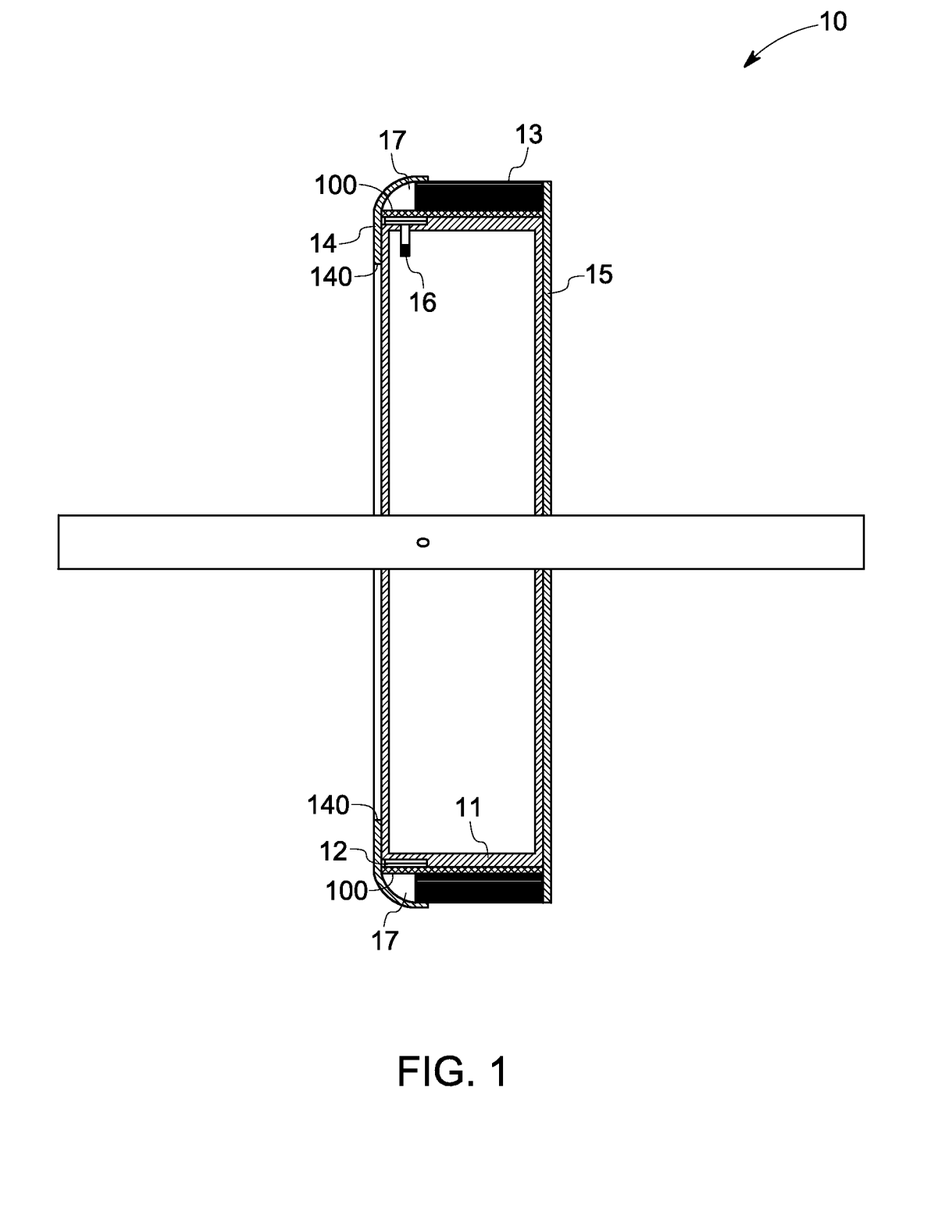
FIG. 1 is a schematic diagram of an apparatus in accordance with one embodiment of the invention.

FIG. 1 illustrates a schematic diagram of an apparatus 10 in accordance with one embodiment of the invention. In embodiments of the invention, it should be noted that the schematic diagrams are merely illustrative. As illustrated in FIG. 1, the apparatus 10 comprises a mold 11, a bladder 12, a forming element 13, and a pressure element 14, together for forming at least one flange 102 (shown in FIG. 6) on a component 100 disposed on the mold 11.

For the example arrangement shown in FIG. 1, bladder 12 is equipped with a valve 16 configured to pass a substance into and to inflate the bladder 12. Alternatively, the valve 16 may not be employed. The substance may comprise gas, such as air or liquid, such as water. In some embodiments of the invention, the substance may comprise air. Further, in some non-limiting examples, the apparatus 10 may further comprise a reaction element 15 disposed at one end of the mold 11 to cooperate with the mold 11, the bladder 12, and the forming element 13 for forming the flange. In other arrangements, the reaction element 15 is not employed.

Figure 2:
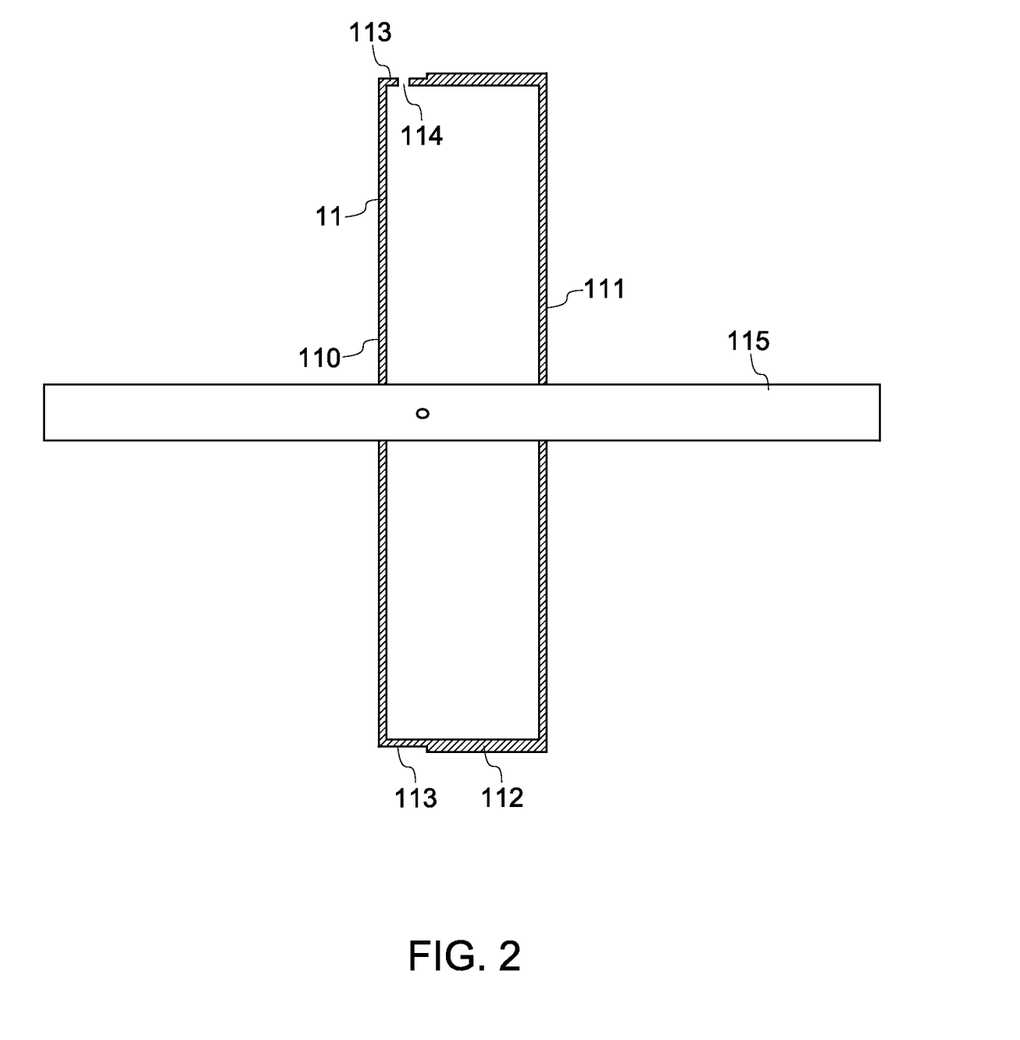
FIG. 2 is a schematic diagram of a mold of the apparatus shown in FIG. 1.

FIG. 2 illustrates a schematic diagram of the mold 11. For the example arrangement illustrated in FIG. 2, the mold 11 comprises a mandrel having a circular shape and configured to rotate about an axis 115. Alternatively, in some examples, the mold 11 may comprise other elements with other shapes, such as a rectangular shape. The mold 11 may be formed from a variety of materials with certain hardness, including but not limited to metals or metal alloys. It should be noted that the mandrel 11 is merely illustrative, and the invention is not limited to a specific mandrel.

In the exemplary embodiment, the mandrel 11 comprises first and second side surfaces 110, 111, a periphery surface 112 disposed between the first and second side surfaces 110, 111, and a step 113 disposed around the periphery surface 112 and located at a corner (not labeled) between the periphery surface 112 and the first side surface 110. In other examples, the step 113 may be defined on a portion of the periphery surface 112 and/or spaced away from the first and second side surfaces 110, 111.

In certain embodiments, the mandrel 11 may comprise more than one step 113 thereon to form multiple flanges on the component 100. In one non-limiting example, a fan case (not shown) typically comprises two flanges. Thus, the mandrel 11 used to from a composite fan case with two flanges may comprise two steps for forming two flanges on the fan case. Additionally, for the configuration shown in FIG. 2, the mandrel 11 further comprises an inlet 114 for receiving the valve 16 (shown in FIG. 3).

Figure 3:
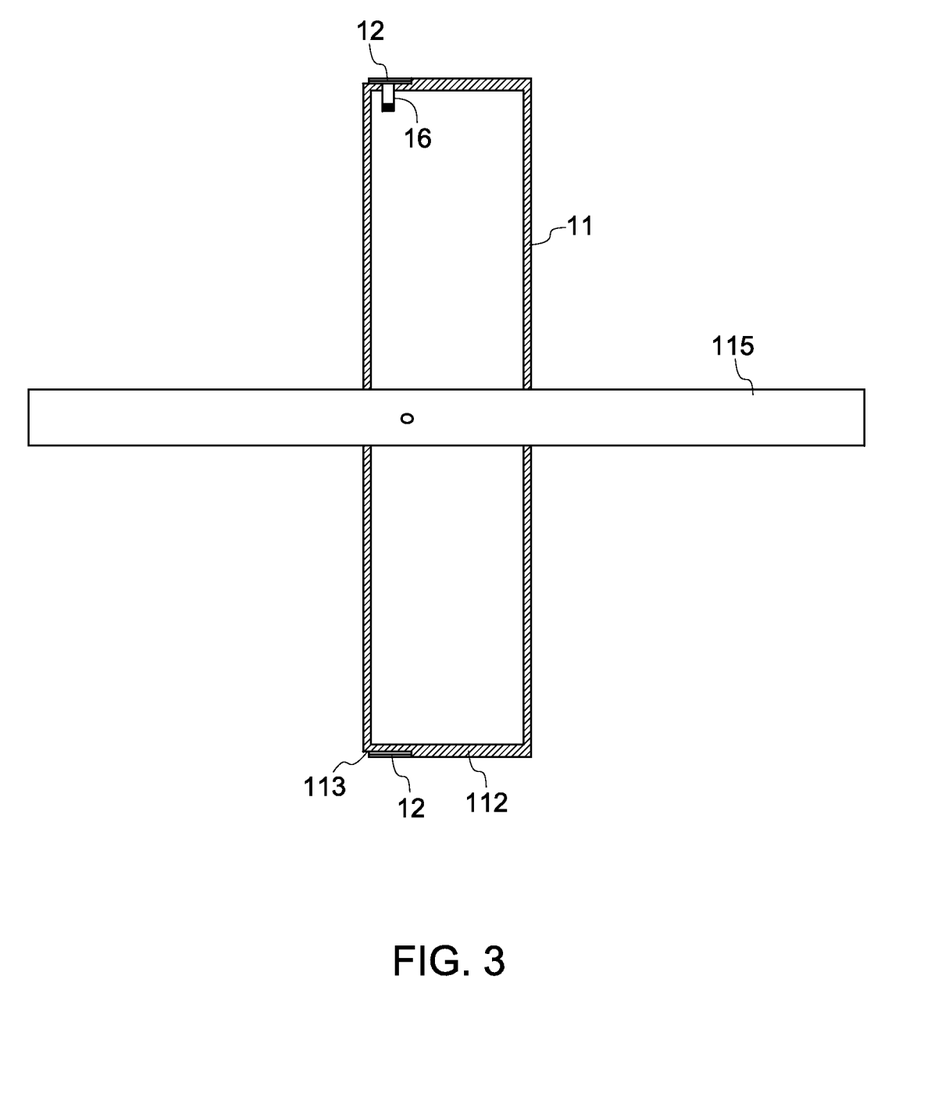
FIG. 3 is a schematic diagram depicting a bladder disposed on the mold shown in FIG. 2.

After the mold 11 is provided and for the arrangement illustrated in FIG. 3, the bladder 12 is disposed within the step 113 so as to be located around the mandrel 11, and be flush with the periphery surface 112 of the mandrel 11. That is, the bladder 12 is flush with an outer diameter (not labeled) of the mandrel 11. Alternatively, the bladder 12 may be lower or higher than the outer diameter of the mandrel 11. In embodiments of the invention, the bladder 12 may comprise any flexible material that is configured to be inflatable. In some examples, the bladder may comprise, but is not limited to, Butyl material, silicone rubber, fluoro-elastomers, or nylon bagging films. In one non-limiting example, the bladder 12 comprises an inner tube type bladder.

Additionally, in the exemplary arrangement, the valve 16 is received in the inlet 114 and connected to the bladder 12 with one end (not labeled) thereof. It should be noted that for certain embodiments, the valve 16 may be an integral part of bladder 12, for example. In other embodiments, the valve 16 may be a separate element that is connected to the bladder 12. The other end of the valve 16 may be connected to a hose (not shown), which may be connected to a source (not shown) for delivering air or water (or other gases or liquids) into the bladder 12.

Figure 4:
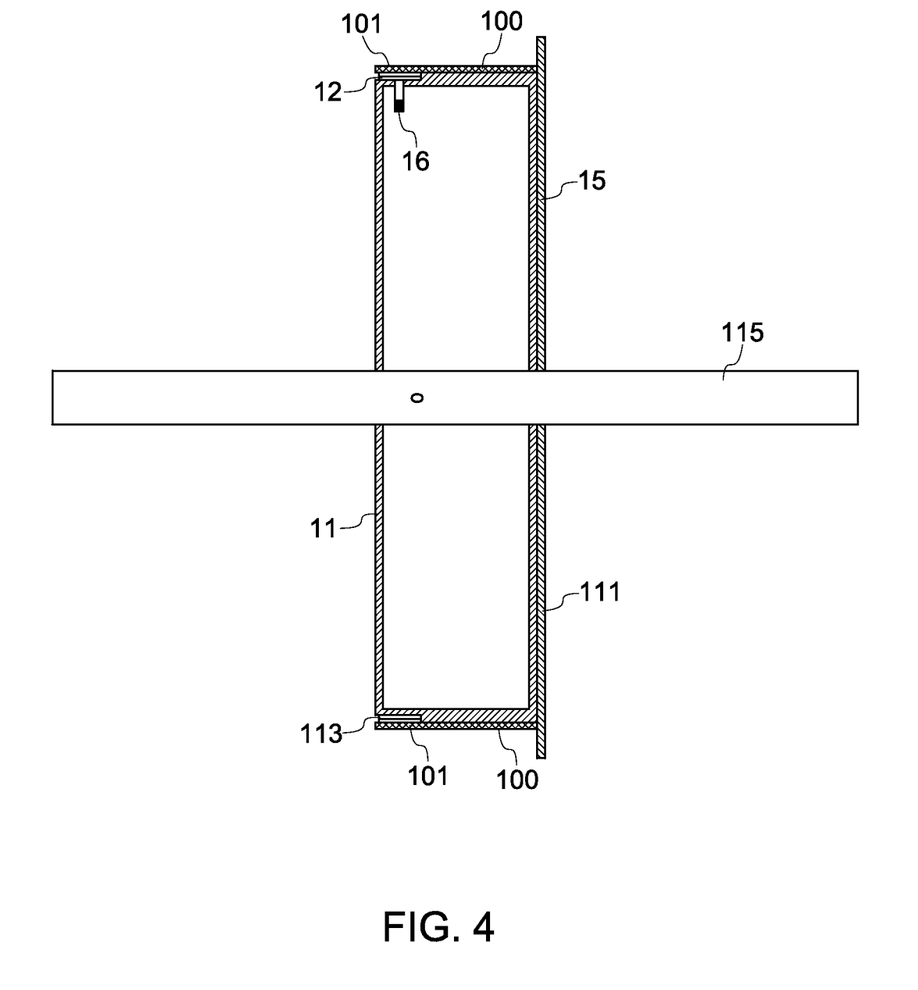
FIG. 4 is a schematic diagram depicting a component and a reaction element arranged on the mold shown in FIG. 3.

FIG. 4 illustrates a lay up of the component 100 and the reaction element 15. As illustrated in FIG. 4, after the bladder 12 is disposed within the step 113, the component 100 is disposed on the periphery surface 112, and at least a portion (flange portion) 101 of the component 100 extends into the step 113 so that at least a portion of the bladder 12 is located between the component 100 and the mandrel 11. As indicated in FIGS. 3 and 4, the bladder 12 is disposed on the mandrel 11 prior to lay up of the component 100. In certain other examples, the component 100 may be disposed prior to the bladder 12. Thus, in one non-limiting example, the component 100 may be located between the bladder 12 and the mandrel 11, and the step 113 may be used for forming the flange.

In the exemplary embodiment, the component 100 comprises composite material. Alternatively, in some examples, the component 100 may be formed of other composite material. As used herein, the term "composite material" indicates a material including two or more constituent materials with different physical or chemical properties. The constituent material may generally comprise two categories: matrix material and reinforcement material. At least one portion of each category is included in the composite material. The matrix material surrounds and supports the reinforcement material, and may comprise metal or non-metal material. Non-limiting examples of the non-metal material may comprise polyester resin, acrylic resin, vinyl ester resin, epoxy resin, polyurethane resin, phenolic resin, polyamide resin, or others. The reinforcement material imparts their mechanical and physical properties to enhance the matrix material properties. Non-limiting examples of the reinforcement material may comprise fiber or ground mineral.

In some embodiments of the invention, the composite component 100 may comprise one or more fibers and one or more resins. The fiber may include, but is not limited to, glass fiber, graphite fiber, carbon fiber, ceramic fiber, aromatic polyamide fiber, and mixtures thereof. In some non-limiting examples, the one or more fibers may be pre-impregnated with the one or more resins prior to be deposited or placed on the mandrel 11. The resin may include, but is not limited to, vinyl ester resin, polyester resin, acrylic resin, epoxy resin, polyurethane resin, phenolic resin, polyamide resin, and mixtures thereof. In one example, the composite component 100 may comprise carbon fiber and an epoxy resin. For the arrangement shown in FIG. 4, the composite component 100 may be deposited on the mandrel 11 using any of a variety of techniques, including without limitation, tape placement, fiber placement, and hand lay up.

As indicated in FIG. 4, the reaction element 15 is installed on one end of the mandrel 11 defining the second surface 111, and extends higher than the outer diameter of the mandrel 11 so that the reaction element 15 can react to the forming force generated during formation of the flange on the composite component 100. In some examples, the reaction element 15 may comprise an annular ring. Alternatively, the reaction element 15 may comprise a disk shape. According to different applications, the reaction element 15 may have other shapes, such as a rectangular shape. Additionally, similar to the mold 11, the reaction element 15 may comprise a variety of materials with certain hardness, including but not limited to metals or metal alloys.

Figure 5:
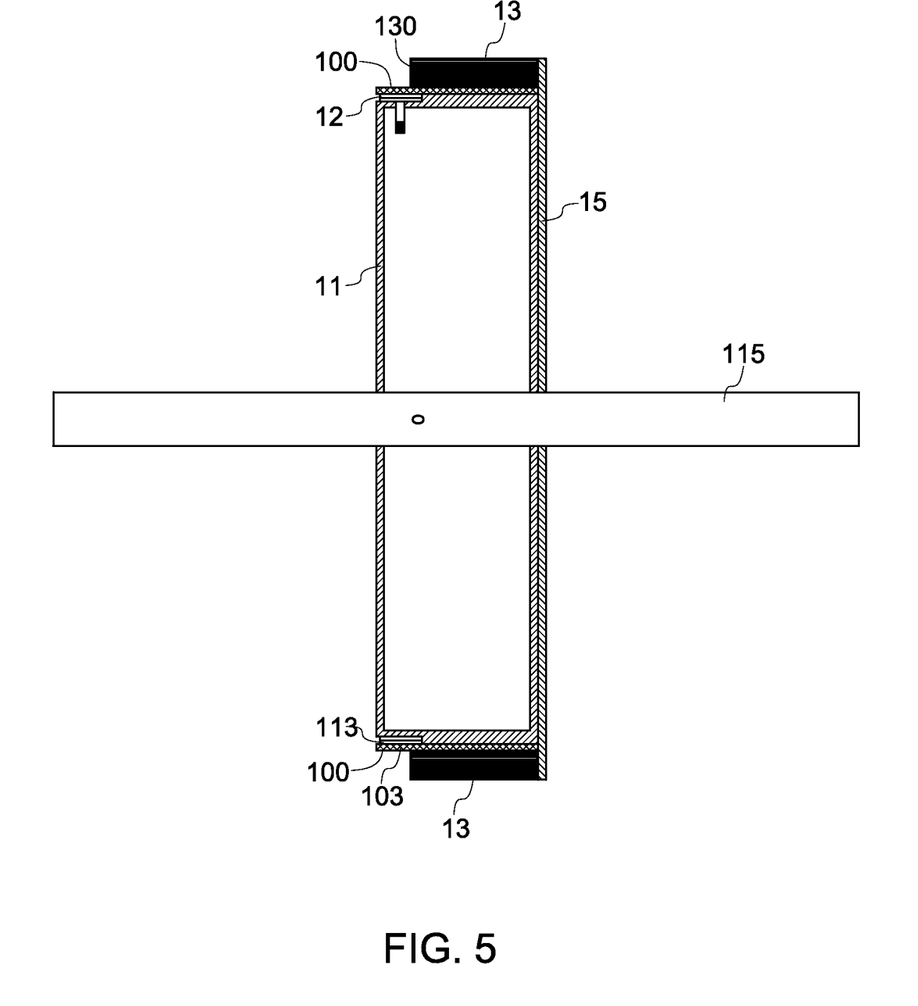
FIG. 5 is a schematic diagram depicting a forming element extending around the component shown in FIG. 4.

FIG. 5 illustrates the apparatus of FIGS. 2-4 equipped with the forming element 13. In the exemplary embodiment, after the composite component 100 is deposited or placed on the mandrel 11, the forming element 13 is installed on the composite component 100 and extends partially across the step 113. In some arrangements, the forming element 13 may not extend across the step 113 according to different applications. In embodiments of the invention, the forming element 13 is configured to react to the forming force of the flange to press or hold the composite component 100 securely on the mandrel 11. In one non-limiting example, the forming element 13 may further be configured to determine a length of the desired flange. That is, according to different desired lengths of the flanges, the forming element 13 may be positioned at different positions of the component 100 to get the flanges with desired lengths. In embodiments of the invention, the forming element 13 may comprise a variety of materials and shapes. In one example, the forming element 13 comprises one or more metal bands.

Thus, in the exemplary arrangement, when forming the flange on the composite component 100, the forming element 13 and the reaction element 15 can react to the forming forces to facilitate the formation of the flange. In other examples, the reaction element 15 may not be employed. It should be noted that although FIGS. 4 and 5 show the reaction element 15 as being installed prior to the forming element 13, for some embodiments, the forming element 13 may be installed prior to the reaction element 15.

After the forming element 13 is installed on the mandrel 11, as indicated in FIG. 1, the pressure element 14 is assembled to fit to the mandrel 11 and the forming element 13. Thus, a space 17 is defined between the pressure element 14 and the mandrel 11. The bladder 12 and the flange portion 101 of the component 100 are received in the space 17. In the exemplary embodiment, the pressure element 14 comprises a dome and partially contacts the forming element 13, and has an inner edge 140 extending below an inner diameter of the mandrel 11. Accordingly, the arrangement shown in FIG. 1 is formed. In other embodiments, the pressure element 14 may have other shapes.

Figure 6:
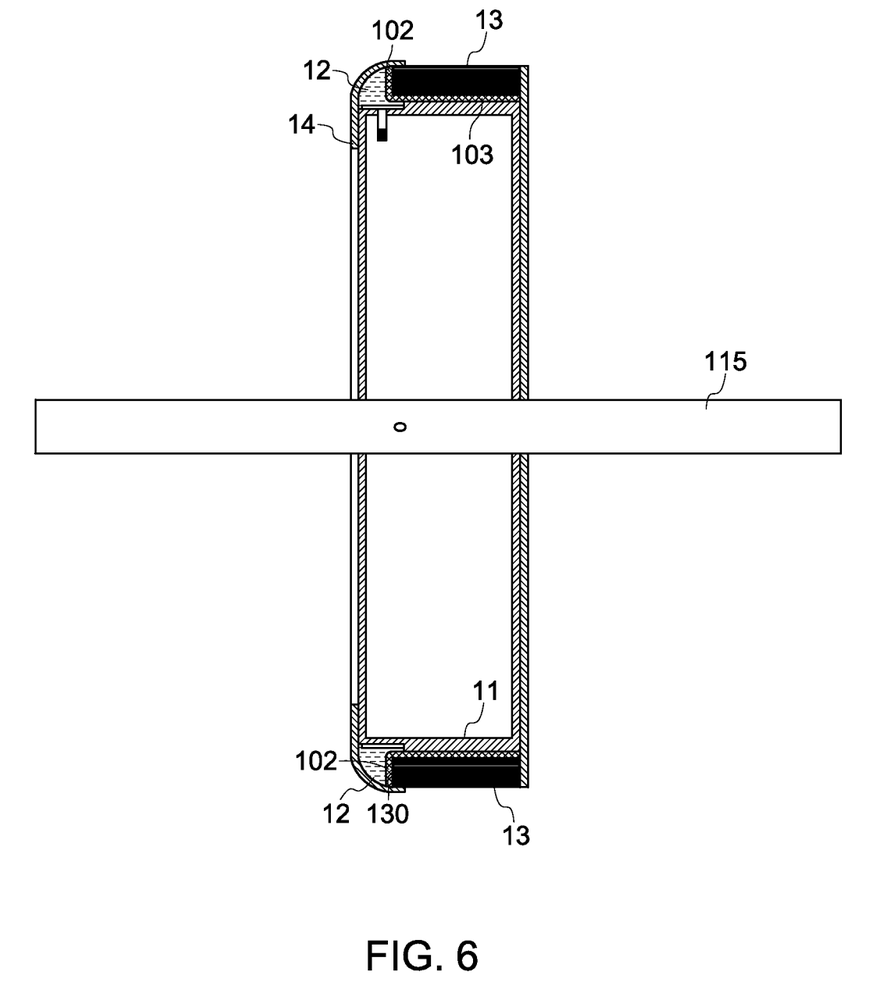
FIG. 6 is a schematic diagram illustrating formation of a flange on the component shown in FIG. 1.

Subsequently, a substance, such as air is delivered into the bladder 12 through the valve 16. In some examples, the valve 16 may not be employed. Thus, as shown in FIG. 6, the bladder 12 is inflated and confined in the space 17 so as to impart a forming force to the flange portion 101 to form the flange 102. During the formation of the flange 102, the forming element 13 and/or the reaction element 15 fix the component 100 on the mandrel 11 to avoid movement of the component 100.

Additionally, as indicated in FIGS. 5 and 6, the forming element 13 has an edge 130 that is perpendicular to a primary surface 103 of the component 100. In other examples, the edge 130 may be angled (not shown) so as to form a flange that is not perpendicular to the primary surface 103.

In certain embodiments, after forming the flange 102, the composite component 100 with the flange 102 may be cured. As will be recognized by those skilled in the art, the cure process and conditions may depend upon the material (the fiber and the resin) of the composite component 100. In one non-limiting example, the apparatus 10 with the composite component 100 therein may be placed in an oven (not shown) and heated to a desired temperature for a desired duration, depending on the material of the component 100. In another non-limiting example, the apparatus 10 with the composite component 100 therein is placed in an oven and heated to a desired temperature prior to inflating the bladder 12. Then, the bladder 20 is inflated and the flange 102 is formed. For other component material, it may not be necessary to heat the composite component 100 for curing. In certain examples, the component 100 may not need to be cured.

In addition, in embodiments of the invention, the pressure element 14, the forming element 13, the composite component 100, and/or the reaction element 15 may be detachable so that the composite component 100 can be detached from the mandrel 11.

Figure 7:
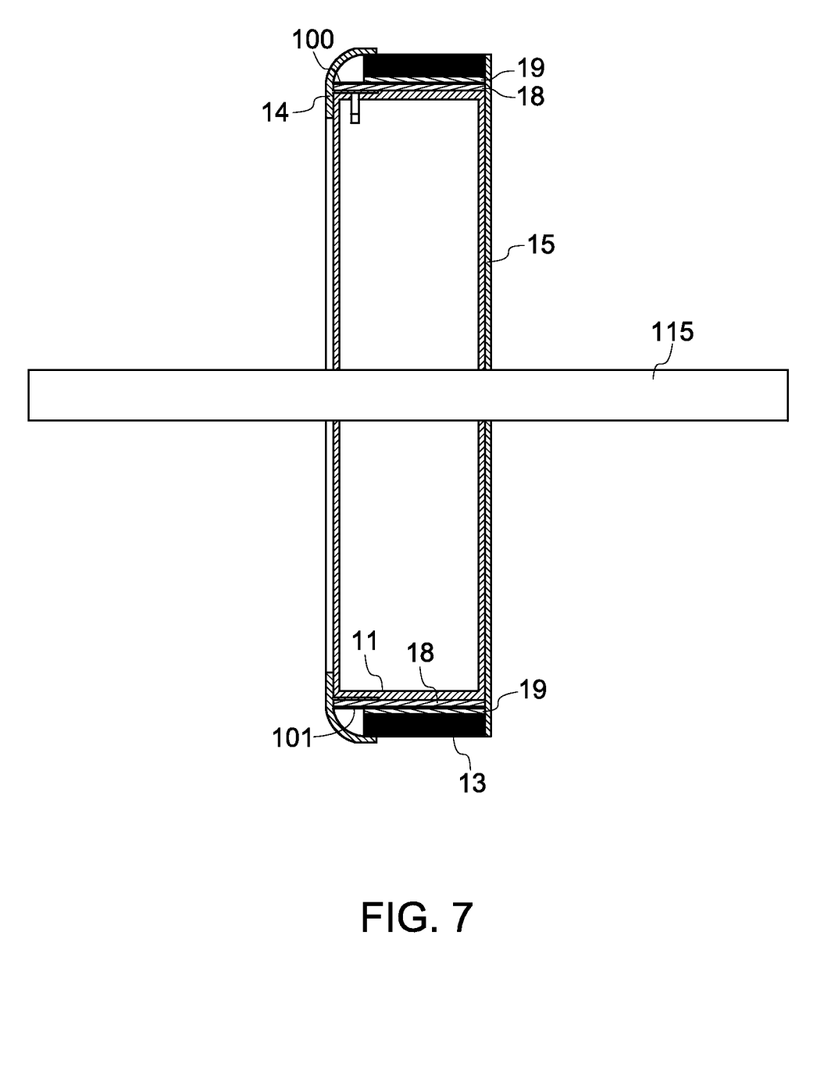
FIG. 7 is a schematic diagram of the apparatus in accordance with another embodiment of the invention.

In certain embodiments, as indicated in FIG. 7, the apparatus 10 may further comprise a first release film 18 disposed between the mandrel 11 and the composite component 100 to facilitate the detachment of the component 100 from the mandrel 11 after the flange 101 is formed and/or cured. Additionally, in some examples, as illustrated in FIG. 7, the apparatus 10 may comprise a second release film 19 disposed between the composite component 100 and the forming element 13 to facilitate the removal of the forming element 13 from the composite component 100 after the flange 101 is formed and/or cured. The first and second release films 18, 19 may be the same or different, which can be easily implemented by one skilled in the art.

Figure 8:
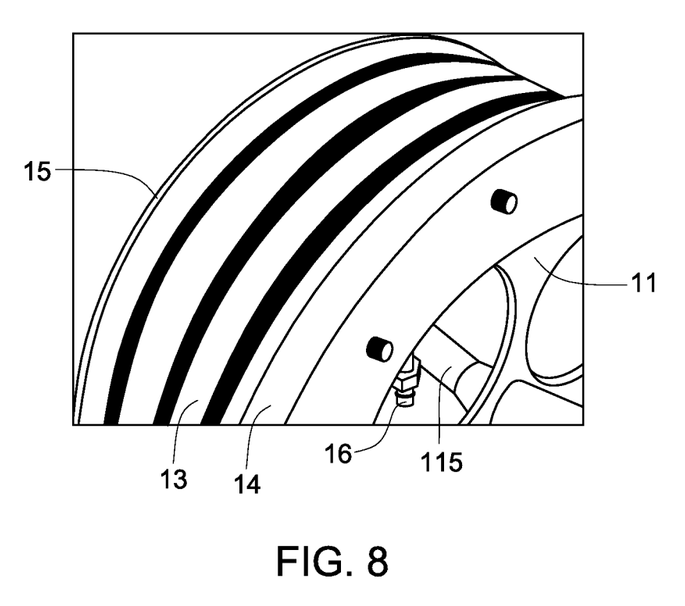
FIG. 8 is a perspective diagram of the apparatus shown in FIG. 1 in accordance with one embodiment of the invention.

FIG. 8 is a perspective diagram of the apparatus 10 shown in FIG. 1 in accordance with one embodiment of the invention. As illustrated in FIG. 8, the apparatus 10 comprises the mandrel 11, the forming element 13 disposed around the mandrel 11, and a pressure element 14 coupled to one end of the mandrel 11 and adjacent to the forming element 13. The composite component and the bladder (not shown) are disposed in the apparatus 10. Additionally, the first release film and/or the second release film (not shown) may or may not be disposed in the apparatus.

Figure 9:
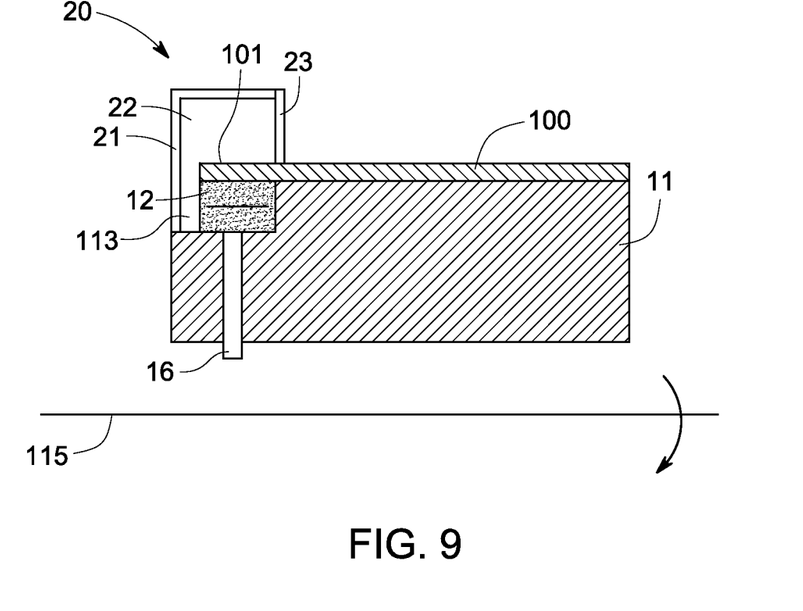
FIG. 9 is a schematic diagram of the apparatus in accordance with yet another embodiment of the invention.

FIG. 9 is a schematic diagram of an apparatus 20 in accordance with yet another embodiment of the invention. The apparatus 20 shown in FIG. 9 may be similar to the apparatus 10 shown in FIGS. 1-8, and the same numerals in FIGS. 1 and 9 may indicate the same elements. As illustrated in FIG. 9, one end of a pressure element 21 is coupled to the step 113 to define a space 22 with the mandrel 11 for receiving the bladder 12 and the flange portion 101 of the component 100. In one non-limiting example, the pressure element 21 comprises an aluminum weldment. The apparatus 20 further comprises a forming element 23 to hold the composite component 100 securely on the mandrel 11.

Thus, during inflation within the space 22, the bladder 12 imparts a forming force to curves the flange portion 101 to form the flange 102 (shown in FIG. 6) on the component 100.

In other examples, the apparatus 20 may also employ the reaction element 15 to cooperate with the forming element 23.

Additionally, for the arrangements in FIGS. 1 and 9, the pressure elements 14, 21 and the forming elements 13, 23 are separate elements. In certain embodiments, the pressure elements 14, 21 may be unitary with the respective forming elements 13, 23. That is, each of the pressure element and the forming element may be employed to function as both the pressure element and the forming element.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. An apparatus for forming a flange on a component, the apparatus comprising:
   a mold disposed for placement of the component thereon, wherein the mold comprises a mandrel;
   a pressure element configured to cooperate with the mold to define a space therebetween;
   a forming element configured to hold the component with a portion thereof extending into the space and another portion immovably held on the mold by the forming element; and
   a bladder disposed in the space and configured to be located between the component and the mandrel to impart a forming force to the portion extending into the space to form the flange on the component when the bladder is inflated.

2. The apparatus of claim 1, wherein the component comprises composite material, and wherein the composite material comprises one or more fibers and one or more resins.

3. The apparatus of claim 1, wherein the apparatus comprises a plurality of bladders for forming a plurality of flanges on the component, wherein the mold defines a plurality of steps, and wherein respective ones of the bladders are disposed within respective ones of the steps to be positioned between the mold and respective portions of the component.

4. The apparatus of claim 1, wherein the mold defines a step, and wherein the bladder is disposed within the step to be positioned between the mold and the portion of the component extending into the space.

5. The apparatus of claim 4, wherein the forming element extends partially across the step.

6. The apparatus of claim 1, wherein the bladder comprises an inner tube type bladder.

7. The apparatus of claim 1, wherein the forming element comprises at least one metal band.

8. The apparatus of claim 1, further comprising a release film disposed between the component and the mold.

9. The apparatus of claim 1, further comprising a valve configured to connect the bladder to a source to inflate the bladder.

10. The apparatus of claim 1, wherein the component is disposed around a periphery surface of the mold.

11. The apparatus of claim 10, wherein the pressure element is assembled onto the mold to define the space therebetween.

12. The apparatus of claim 11, wherein the pressure element contacts the forming element with one end thereof.

13. The apparatus of claim 10, wherein the mold comprises a first side surface and a second side surface, wherein the periphery surface is disposed between the first and second side surfaces.

14. The apparatus of claim 13, wherein the pressure element is disposed on the first side surface.

15. The apparatus of claim 14, further comprising a reaction element configured to be coupled to the second side surface of the mold to react to the forming force during formation of the flange on the component.

16. The apparatus of claim 4, wherein the step is disposed on a periphery of the mold for accommodation of the bladder.

17. The apparatus of claim 16, wherein the pressure element is disposed on the step to define the space between the pressure element and the mold.

* * * * *